Aug. 15, 1944.     R. G. LE TOURNEAU     2,355,893
DRAFT UNIT
Filed Oct. 29, 1943
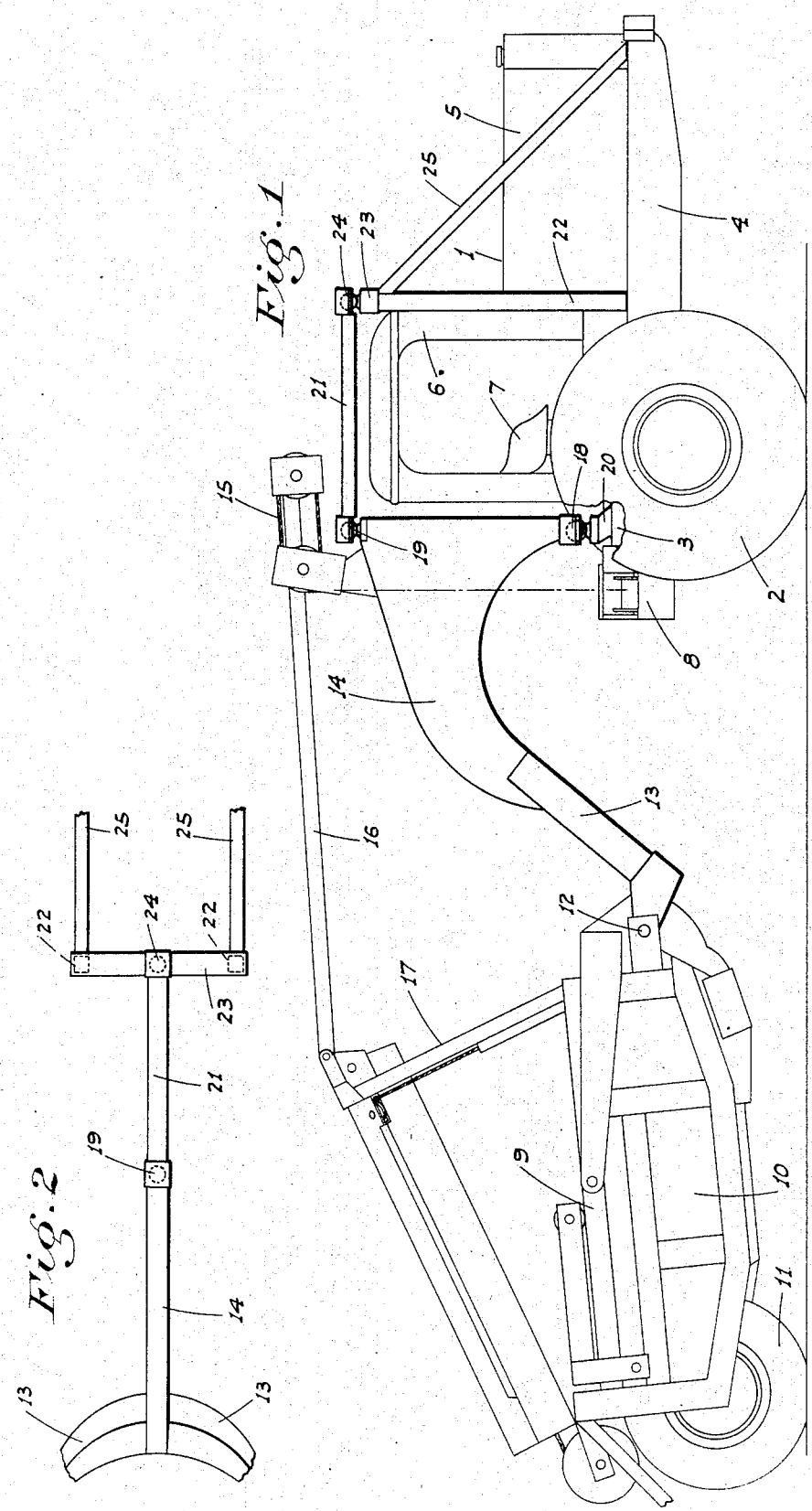
Inventor
R. G. Le Tourneau
Attorneys Patented Aug. 15, 1944

2,355,893

UNITED STATES PATENT OFFICE 2,355,893

DRAFT UNIT

Robert G. Le Tourneau, Peoria, Ill., assignor to R. G. Le Tourneau, Inc., Stockton, Calif., a corporation of California Application October 29, 1943, Serial No. 508,115

8 Claims. (Cl. 280—33)

This invention is directed to, and it is one of the objects to provide, a novel draft unit adapted for connection between a tractor and a trailing implement, as for example an earth working and carrying scraper. Such draft unit, which is especially designed for use in a two-wheel tractor and trailing implement combination, maintains the tractor against downward tilting at its forward end but permits of relative lateral tilting between the tractor and trailing implement as the same traverse uneven ground, together with independent steering of the tractor relative to said trailing implement.

The present invention comprises a modification of the draft units shown in United States Patents No. 2,189,072, dated February 6, 1940, and No. 2,223,375, dated December 3, 1940.

A further object of this invention is to provide a draft unit, as above, which is so constructed that it provides high clearance above the ground directly rearwardly of the tractor and in the path of lateral swinging movement of the tractor wheels, whereby the tractor can turn sharply relative to the trailing implement without the tractor wheels engaging any portion of said draft unit.

An additional object of this invention is to provide a draft unit between a two-wheel tractor and trailing implement, which draft unit comprises an arched, longitudinally extending yoke, said yoke being secured at its rear end to the trailing implement in normally rigid relation, the forward end portion of the yoke being of substantial height, axially alined ball and socket units mounted in connection with the top and bottom of said forward end portion of the yoke, means mounting the lower ball and socket unit on the tractor at the rear a sufficient height above the ground to dispose said arched yoke in bridging and clearance relation to the path of transverse swinging movement of the tractor wheels, a rigid drawbar secured in connection with the upper ball and socket unit and projecting forwardly therefrom above the operator's seat to a termination ahead of the vertical plane of the wheel axis of the tractor, a fixed frame upstanding from the tractor and terminating at its upper end in substantially the horizontal plane of the top of said forward end portion of the yoke, and a ball and socket unit connecting the forward end of said drawbar on the upper end of said upstanding frame.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of a two-wheel tractor and trailing implement combination connected by the draft unit herein described.

Figure 2 is a fragmentary top plan view of the arched yoke and drawbar unit as connected between the tractor and trailing implement.

Referring now more particularly to the characters of reference on the drawing, the tractor and trailing implement combination, which is here shown as connected by the draft unit, comprises a two-wheel tractor, indicated generally at 1, having a pair of transversely spaced, ground engaging wheels 2 supported by a transmission housing 3 which extends therebetween. An engine mount 4 projects forwardly from the transmission housing 3 in otherwise unsupported ground clearance relation, said mount 4 supporting an engine within a hood 5. An operator's cab 6 is mounted and upstands from the deck of the transmission housing 3, as does an operator's seat 7 disposed within the cab. The tractor includes a conventional rearwardly projecting power winch 8, from which operating cables run to the trailing implement for operation of the latter.

In the present instance the trailing implement is illustrated as being an earth working and carrying scraper. Different kinds of trailing implements or vehicles may, however, be employed with the draft unit.

The scraper 9 comprises, conventionally, a body 10 pivotally supported at the rear end by transversely spaced ground engaging wheels 11. At the forward end the body 10 is pivotally supported, at transversely spaced points 12, in connection with the lower ends of forwardly converging upwardly sloping legs 13 fixed at their upper ends in connection with the rear end of a vertically disposed, longitudinally extending yoke 14 of arch-like configuration; this yoke being a part of the hereinafter described draft unit.

A cable-actuated, tilt control mechanism, indicated generally at 15 and including a push beam 16, is connected between the top of the yoke 14 and an upstanding frame 17 on the scraper 9; such tilt control mechanism being operated from the winch 8 to control raising and lowering of the scraper body 10 relative to the ground.

The draft unit comprises, with the arched yoke 14, the following arrangement:

The yoke 14 at its forward end is of substantial height and is fitted at the bottom of said end with a ball and socket unit 18, and at the top of said end with a ball and socket unit 19. The ball and socket units 18 and 19 are disposed in axial alinement. The ball and socket unit 18 is mounted in connection with a rigid post 20 which is fixed on the deck of transmission housing 3 rearwardly of the operator's seat 7 and centrally between the sides of the tractor; said forward end portion of the yoke 14 upstanding adjacent but in clearance relation to the back of cab 6. Such forward end portion of the yoke is of such height that the ball and socket unit 19 is disposed in a horizontal plane above the top of cab 6.

A heavy-duty drawbar 21 is fixed in connection with the movable member of ball and socket unit 19 and projects forwardly therefrom above the cab 6 in a substantially horizontal plane; said drawbar 21 terminating at its forward end slightly ahead of the cab. An upstanding frame 22 is rigidly mounted in connection with the engine mount 4 and terminates at its upper end in substantially the horizontal plane of the top of the forward end portion of yoke 14. This frame 22 includes a top horizontal cross member 23, and a ball and socket unit 24 connects the forward end of drawbar 21 with the cross member 23 centrally of the ends of the latter. The frame 22 may be suitably strengthened by diagonal braces 25 which extend forwardly and downwardly on opposite sides of hood 5 to connection with the engine mount 4 adjacent the forward end of the latter.

With the above described draft unit connecting the two-wheel tractor and its trailing implement or vehicle, such tractor can turn sharply relative to the trailing implement, without the wheels 2 engaging any portion of the draft unit and particularly the yoke 14, which is disposed—in bridging relation to the path of lateral swinging movement of said wheels—at a height greater than the diameter of said wheels. While providing the above wheel clearance, the described draft unit permits of relative lateral tilting of the tractor and trailing implement as the same traverse uneven ground, yet maintains the tractor against downward tilting at the front, and in steerable relation to the implement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A draft unit adapted to connect a two-wheel tractor in supported, steerable, and limited laterally tiltable relation to a trailing implement, said draft unit comprising a rigid draft member, means securing the draft member at its rear end to the implement in normally rigid relation, a pair of vertically spaced universal connections mounted on the draft member at its forward end, the lower one of said universal connections being secured to the tractor at the rear, a drawbar secured to the upper universal connection and projecting forwardly therefrom, an upstanding frame on the tractor some distance ahead of the forward end of said draft member, and another universal connection between the forward end of said drawbar and said frame.

2. A draft unit adapted to connect a two-wheel tractor in supported, steerable, and limited laterally tiltable relation to a trailing implement, said draft unit comprising a rigid draft member, means securing the draft member at its rear end to the implement in normally rigid relation, a pair of vertically spaced universal connections mounted on the draft member at its forward end, the lower one of said universal connections being secured to the tractor at the rear, a drawbar secured to the upper universal connection and projecting forwardly therefrom, an upstanding frame on the tractor some distance ahead of the forward end of said draft member, and another universal connection between the forward end of said drawbar and said frame; said pair of vertically spaced universal connections being vertically alined, and said drawbar being substantially horizontal.

3. A draft unit adapted to connect a two-wheel tractor in supported, steerable, and limited laterally tiltable relation to a trailing implement, said draft unit comprising a rigid longitudinally extending draft yoke of arch-like configuration in side elevation, means securing the yoke at its rear end to the implement in normally rigid relation, a pair of vertically spaced universal connections mounted on the yoke at its forward end, the lower one of said universal connections being mounted on the tractor at the rear end at such elevation that the arched yoke bridges and is clear of the path of lateral swinging movement of the tractor wheels, a drawbar secured to the upper universal connection and projecting forwardly therefrom, an upstanding frame on the tractor some distance ahead of the forward end of said yoke, and another swivel connection between the forward end of said drawbar and said frame.

4. A draft unit adapted to connect a two-wheel tractor in supported, steerable, and limited laterally tiltable relation to a trailing implement, said draft unit comprising a rigid longitudinally extending draft yoke of arch-like configuration in side elevation, means securing the yoke at its rear end to the implement in normally rigid relation, said yoke being of substantial height at its forward end portion, a pair of axially alined, vertically spaced ball and socket units, one being mounted on the top and the other on the bottom of said forward end portion of the yoke, the lower ball and socket unit being mounted on the tractor at the rear at such elevation that the arched yoke bridges and is clear of the path of lateral swinging movement of the tractor wheels, a drawbar secured to the upper ball and socket unit and projecting forwardly therefrom, an upstanding frame on the tractor some distance ahead of the forward end of said yoke, and another ball and socket unit connected between the forward end of said drawbar and said frame.

5. A draft unit adapted to connect a two-wheel tractor in supported, steerable, and limited laterally tiltable relation to a trailing implement, said draft unit comprising a rigid longitudinally extending draft yoke of arch-like configuration in side elevation, means securing the yoke at its rear end to the implement in normally rigid relation, said yoke being of substantial height at its forward end portion, a pair of axially alined, vertically spaced ball and socket units, one being mounted on the top and the other on the bottom of said forward end portion of the yoke, the lower ball and socket unit being mounted on the tractor at the rear at such elevation that the arched yoke bridges and is clear of the path of lateral swinging movement of the tractor wheels, a drawbar secured to the upper ball and socket unit and projecting forwardly therefrom, the tractor including a forwardly projecting, ground overhanging engine mount, an upstanding frame secured on said mount, and another ball and socket unit connected between the forward end of said drawbar and said frame.

6. A draft unit adapted to connect a two-wheel tractor in supported, steerable, and limited laterally tiltable relation to a trailing implement, said draft unit comprising a rigid longitudinally extending draft yoke of arch-like configuration in side elevation, means securing the yoke at its rear end to the implement in normally rigid relation, said yoke being of substantial height at its forward end portion, a pair of axially alined, vertically spaced ball and socket units, one being mounted on the top and the other on the bottom of said forward end portion of the yoke, the tractor including a transmission housing between the wheels, the lower ball and socket unit being mounted in connection with said housing adjacent the rear of the latter and at such elevation that the arched yoke bridges and is clear of the path of lateral swinging movement of the tractor wheels, a drawbar secured to the upper ball and socket unit and projecting forwardly therefrom, an upstanding frame on the tractor some distance ahead of the forward end of said yoke, and another ball and socket unit connected between the forward end of said drawbar and said frame.

7. A draft unit adapted to connect a two-wheel tractor in supported, steerable, and limited laterally tiltable relation to a trailing implement, said draft unit comprising a rigid longitudinally extending draft yoke of arch-like configuration in side elevation, means securing the yoke at its rear end to the implement in normally rigid relation, said yoke being of substantial height at its forward end portion, a pair of axially alined, vertically spaced ball and socket units, one being mounted on the top and the other on the bottom of said forward end portion of the yoke, the tractor including a transmission housing between the wheels and an engine mount projecting forwardly from said housing in ground clearance relation, the lower ball and socket unit being mounted in connection with said housing adjacent the rear of the latter and at such elevation that the arched yoke bridges and is clear of the path of lateral swinging movement of the tractor wheels, a drawbar secured to the upper ball and socket unit and projecting forwardly therefrom, an upstanding frame on the tractor some distance ahead of the forward end of said yoke, and another ball and socket unit connected between the forward end of said drawbar and said frame; said frame upstanding from the engine mount and including a top horizontal cross member, said other ball and socket unit being secured to said cross member centrally of its ends.

8. A draft unit adapted to connect a two-wheel tractor in supported, steerable, and limited laterally tiltable relation to a trailing implement, said draft unit comprising a rigid longitudinally extending draft yoke of arch-like configuration in side elevation, means securing the yoke at its rear end to the implement in normally rigid relation, said yoke being of substantial height at its forward end portion, a pair of axially alined, vertically spaced ball and socket units, one being mounted on the top and the other on the bottom of said forward end portion of the yoke, the lower ball and socket unit being mounted on the tractor at the rear at such elevation that the arched yoke bridges and is clear of the path of lateral swinging movement of the tractor wheels, the tractor including an operator's cab disposed in spaced relation ahead of said forward end portion of the yoke, a fixed frame upstanding from the tractor ahead of the cab, another ball and socket unit mounted on top of said frame, and a drawbar connected between said other ball and socket unit and the ball and socket unit on top of said forward end portion of the yoke, the drawbar being disposed in clearance relation above said cab.

ROBERT G. LE TOURNEAU.